United States Patent Office 3,044,960
Patented July 17, 1962

3,044,960
LUBRICATING OIL CONTAINING METAL SALTS DERIVED FROM HYDROGENATED BRIDGED PHENOLS AND LOW MOLECULAR WEIGHT ACIDS
Arnold J. Morway, Clark, Jeffrey H. Bartlett, New Providence, and Clifford W. Muessig, Roselle, N.J., assignors to Esso Research and Engineering Company, a corporation of Delaware
No Drawing. Filed May 26, 1959, Ser. No. 815,803
10 Claims. (Cl. 252—35)

This invention relates to compositions comprising the metal salts of mixtures of hydrogenated bridged phenols and low molecular weight acids, to oil solutions and dispersions of said compositions, and to methods for their preparation.

The compositions of this invention are used in mineral and synthetic lubricating oils as an extreme pressure, antiwear additive in concentrations between 0.2 and 20 percent by weight, and as a thickener, extreme pressure and anti-wear additive for greases in concentrations between 10 and 40 percent by weight.

In Serial No. 803,363, filed April 1, 1959, new and extremely useful lubricating additive compositions comprising the metal salts of bridged phenols and acetic acid were disclosed. It has now been found that highly effective lubricating additives may be prepared by the catalytic hydrogenation of the bridged phenol and subsequent neutralization of a mixture of this hydrogenated bridged phenol and acetic acid with a polyvalent metal base. By hydrogenation of the bridged phenol, the phenolic or acidic hydroxyl groups are converted to secondary alcohol groups hence are cyclic disecondary glycols. The discovery that these hydrogenated bridged phenols, having essentially no phenolic character and having only aliphatic hydroxyl groups as apparent reactive sites, will cooperate with a metal base and acetic acid to give grease structures of excellent stability was surprising and unexpected. At present the mechanism by which this stabilization is obtained is not known.

In general, the compositions of this invention will be prepared by catalytically hydrogenating the bridged phenol at increased temperatures and pressure, and then neutralizing the mixture of hydrogenated bridged phenols and acetic acid with a metal base. The metal salts of this invention may also be prepared by reacting the metal base with the acid to form a salt and then heating the salt and the hydrogenated bridged phenol until dehydrated. The mol ratio of acetic acid to hydrogenated bridged phenol will be between about 0.02 and 50. Mol ratios of the acid per mol of hydrogenated bridged phenol in the range of 5/1 to 40/1 are preferred.

The metal component of this invention can be any polyvalent metal. Di- and tri-valent metals are preferred with the alkaline earth metals, and especially calcium, being particularly preferred. Examples of the metals included within the invention are barium, chromium, magnesium, cadmium, nickel, iron, cobalt, calcium, zinc and aluminum. Mixtures of these metals may be employed if desired. The metals are usually reacted with the acid or acid and hydrogenated bridged phenol mixture in the form of hydroxides or oxides, but other basic salts such as the carbonates, etc. may be used. The metal base is added in sufficient quantity to neutralize the mixture of acid and hydrogenated bridged phenol and give a slightly alkaline product, up to about 1.0% excess alkalinity calculated as NaOH. Preferably the excess alkalinity will be between about 0.01% and 0.5% calculated as NaOH.

Any of the low molecular weight monocarboxylic acids having about 2 carbon atoms per molecule may be used. The preferred acid for use in accordance with the present invention, however, is acetic acid. Substituted acetic acids may also be used. These include glycolic acid or hydroxy-acetic acid, thioglycolic acid or mercapto-acetic acid, monochloro-acetic acid, dichloro-acetic acid, trichloro-acetic acid and the corresponding bromo and fluoro acetic acids and mixtures of these acids with and without acetic acid.

Mixtures of acetic acid with other organic and inorganic acids in less than equimolar proportions of the latter may also be used. The other organic acids include oxalic acid, propionic acid, acrylic acid and benzene, toluene and xylene sulfonic acids. The inorganic acids include carbonic, hydrochloric, nitric, sulfuric and phosphoric acids.

The generic formula for the acetic and substituted acetic acids to be used in accordance with the present invention is as follows: $Y_n \cdot CH_{3-n} \cdot CO \cdot OH$ wherein $n$ is a digit from 0 to 3 inclusive and Y is a monovalent substituent selected from the group consisting of hydroxyl (—OH), mercapto (—SH) and halogens such as (—Cl), (—F) or (—Br). When $Y = \cdot OH$ or $\cdot SH$, $n$ must equal 1.

The bridged phenols which will be used in the preparation of the hydrogenated bridged phenols of this invention are aromatic compounds having two phenolic groups connected by a common substituent atom. The common substituent atom, or bridging atom is selected from the class of elements comprising carbon, sulphur, nitrogen and silicon. Preferably the bridging atom is selected from the class of carbon and sulphur. The bridging atom will have two of its valences satisfied by carbon atoms (i.e. satisfied by a carbon atom from each of the two benzene rings, which rings also contain an acidic or phenolic hydroxyl radical). Valences in excess of two in the common bridging atom may be satisfied by hydrogen, carbon, oxygen or halogen atoms.

The bridged phenols for use in accordance with this invention may be represented by the following formula:

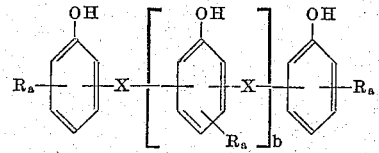

wherein R is a monovalent substituent selected from the group of halogen atoms and hydrocarbyl groups having from 1 to 30 carbon atoms, $a$ is a digit from 0 to 2, $b$ is an integer from 0 to 10 and X is a bridging group containing an atom selected from the group consisting of carbon, sulfur, nitrogen and silicon, preferably being selected from the class of carbon and sulfur and having two valences satisfied by the substitution of hydrogen in the adjacent benzene rings of a pair of phenolic groups as represented by the formula.

An example wherein X has carbon as the common atom is

or methylene. X may be a divalent alkylidene group having from 1 to 16 carbon atoms, for example methylene, ethylidene, 2,2-propylidene, 1,1-octylidene, etc. R is preferably an alkyl group having from 1 to 30 carbon atoms, for example methyl, amyl, iso-octyl, etc., or a halogen, for example chlorine. Specific examples of compounds thus represented by the formula are Bis(4-hydroxyphenyl) methane
2,2-bis(4-hydroxyphenyl) propane
Bis(4-hydroxytolyl) butane
Bis(2-hydroxy-5-nonylphenyl) methane
Bis(2-hydroxy-5-octylphenyl) octane
2,2-bis(3-chloro-4-hydroxyphenyl) propane When the bridging group X has sulfur as the common atom, the divalent linkage may be sulfide (—S—), sulfoxide (—SO—) or sulfone (—SO$_2$—).

Specific examples of phenolic compounds with a bridging sulfur atom include bis(4-hydroxyphenyl) sulfide, bis-(2-hydroxy-5-nonylphenyl) sulfoxide and bis(4-hydroxytolyl) sulfone. In addition to such pure compounds mixed alkyl phenol sulfides and sulfoxides and sulfones derived from them are included within the scope of this invention. The alkyl phenol sulfides are thought to contain a substantial portion of phenol groups bridged by a sulfur atom and may be produced by treating alkyl phenols with sulfur dichloride according to the teachings of U.S. 2,362,289–93 and by other methods familiar to those skilled in the art. These alkyl phenol sulfides are preferred among the sulfur bridged phenols of this invention. Specific examples of these preferred materials include nonyl phenol sulfide, cresol sulfide, xylenol sulfide, t-amylphenol sulfide and dodecy phenol sulfide. The metal salts of alkyl phenol sulfides containing between 0.85 to 0.95 mole of sulfur per mole of alkyl phenol are highly soluble in oil and extremely useful in forming the additive material of this invention for use in hydrocarbon diesel fuels, liquid lubricants and greases.

The hydrogenated bridged phenols are typically prepared by heating 1 mole of the above bridged phenol with 8 to 20 moles of hydrogen gas in a 3-liter bomb under a pressure of 1000 to 5000 pounds per square inch in the presence of 5 to 50 grams of a Raney nickel catalyst. The reaction mixture is heated for about 2 to 20 hours with a resulting pressure drop of about 500 to 800 pounds. The product is dissolved in a non-reactive volatile solvent such as isopropyl alcohol and filtered to remove catalysts. The solvent is then distilled off to give the hydrogenated bridged phenol.

While for convenience the hydrogenated bridged phenols used in this invention have been described as prepared directly from the corresponding phenols by hydrogenation, it will be understood by those skilled in the art that other synthetic routes may be used to prepare compounds having the structure of hydrogenated bis phenols. Thus the term "hydrogenated bis phenols" as used herein is intended to cover products having such structures regardless of method of preparation.

In general, the composition of the present invention is prepared by neutralizing a mixture of a hydrogenated bridged phenol and an acid as hereinbefore defined with a polyvalent metal base followed by heating until the product is dehydrated. The composition can also be prepared by neutralizing the acid with the base prior to mixing with the halogenated bridged phenol and then dehydrating. Generally, but not necessarily, the reaction is carried out in an oil medium. Carrying out the reaction in an oil medium is especially useful in making concentrate lubricating oil additives and greases.

In grease manufacture dehydration is carried out at a temperature in the range of 300° to 600° F., e.g. 350° to 450° F. A preferred embodiment of this invention is to prepare concentrate lubricating oil additives and greases by dissolving the hydrogenated bridged phenol in 5 to 40 molar proportions of the acid, as hereinbefore defined, and then add this solution to a thoroughly mixed quantity of oil and metal base, followed by heating to temperatures between 300° to 350° F. If small quantities of high molecular weight fatty acids are to be added, somewhat higher temperatures are required, e.g. 400° to 500° F. The composition is next allowed to cool to about 180° to 200° F. where conventional additives, if desired, can be added. Homogenization may then be effected by passing through a Gaulin homogenizer or Morehouse mill with subsequent cooling to room temperature.

When the composition is prepared in an oil menstruum, the oil can be either a mineral or synthetic oil having a viscosity at 100° F. in the range of 60 to 3000 Saybolt seconds Universal. Mineral oils having a viscosity at 100° F. in the range of 100 to 1200 SSU are particularly preferred. Synthetic lubricating oils which may be used are those well known in the lubricating art and which are not attacked by acetic acid at temperatures below 212° F.

The composition of the invention may be used as a lubricant additive in the presence of various other additives. For example, material such as calcium petroleum sulfonate and alkaline earth and alkali metal soaps of $C_{12}$ to $C_{30}$ fatty acids; oxidation inhibitors such as phenyl-α-naphthylamine; viscosity index improvers such as polyisobutylene; pour depressants; dyes; other fatty acid soaps, grease thickeners; etc. Some of these additives, such as sulfonates, fatty acid soaps, polyglycols, etc., can profitably be present during the preparation of the additive to also serve as dispersing agents.

EXAMPLE I

A novel grease composition was prepared by taking 1,1-bis(4-hydroxyphenyl) isooctane ($C_8$ oxo bis-phenol) and subjecting it to hydrogenation. This hydrogenated bisphenol was then dissolved in acetic acid and added to a mixture of mineral oil and hydrated lime and intimately mixed in a heated grease kettle. After the temperature of reaction had subsided, external heating was initiated and the temperature raised to 320° F. Heating was continued at this temperature for one-half hour and then terminated. The product was cooled to 180° F. where phenyl alpha-naphthylamine was added and the warm product passed through a Morehouse mill of 0.003" clearance.

The hydrogenated 1,1-bis(4-hydroxyphenyl) isooctane (1,1-bis(4-hydroxycyclohexyl)isooctane) was prepared as follows: 308 grams (approximately 1 mol) of said methane bridged bisphenol was charged to a 3-liter bomb. $H_2$ gas was added to a pressure of 1200 pounds per square inch. 30 grams of Raney nickel catalyst were added in the reaction mixture, heated to between 220 and 230° C. for 8 hours after which time a pressure drop of approximately 550 pounds per square inch was noted within the bomb. The product was then dissolved in isopropyl alcohol and filtered through Hyflo to remove catalyst. The alcohol was distilled off.

Elemental analyses on the hydrogenated product were as follows:

| Analysis | Theory |
| --- | --- |
| C=77.8 | 77.4 |
| H=11.9 | 12.2 |

In addition, an infrared spectrum of the hydrogenated bisphenol showed that there was essentially no aromatic material present. These analyses show that the bisphenol was fully hydrogenated to form an isoheptyl methane bridged bis-cyclohexanol.

A second grease composition was prepared according to the procedure outlined above, except that a hydrogenated bis(4-hydroxyphenyl) methane (bis(4-hydroxycyclohexyl)methane) was substituted for the hydrogenated 1,1-bis(4-hydroxyphenyl) isooctane. Hydrogenation of this methane bridged bisphenol was accomplished according to the above procedure.

Additional grease compositions were prepared at different mol ratios of acid to bis(4-hydroxycyclohexyl) alkane. The use of minor amounts of fatty acid soaps (hydroxy stearic acid) are also shown in the additional examples.

Table I shows the compositions of the various greases in terms of weight percent and the properties exhibited by these greases.

Table I

| Formulation, Percent by Weight | A | B | C | D | E | F | G |
|---|---|---|---|---|---|---|---|
| Glacial Acetic Acid | 15.0 | 10.0 | 15.0 | 12.0 | 10.0 | 10.0 | 10.00 |
| Bis(4-hydroxycyclohexyl) methane | | 5.0 | | 6.2 | 1.5 | | 1.50 |
| 1,1-Bis(4-hydroxycyclohexyl)isooctane | 4.0 | | 2.0 | | | 1.5 | 0.75 |
| Hydrofol Acids 51 [1] | | | | | 1.5 | 1.5 | 0.75 |
| 12-Hydroxy Stearic Acid | | | 2.0 | | | | 0.75 |
| Hydrated Lime | 10.0 | 8.0 | 10.7 | 9.5 | | 7.5 | 7.50 |
| Phenyl α Naphthylamine | 1.0 | 1.0 | 1.0 | 1.0 | 1.0 | | 1.00 |
| Mineral Oil (55 SSU @ 210° F.) | 70.0 | 76.0 | 69.3 | | 78.5 | 79.5 | 78.50 |
| Maximum temperature, °F | 320 | 450 | 320 | 300 | 400 | 400 | 400 |
| Properties: | | | | | | | |
| Dropping Point, °F | 500+ | 500+ | 500+ | 500+ | 500+ | 500+ | 500+ |
| Penetration 77° F. and mm./10— | | | | | | | |
| Unworked | 330 | 385 | 280 | 310 | 250 | 298 | 276 |
| Worked 60 strokes | 331 | 388 | 282 | 318 | 294 | 325 | 294 |
| Worked 10,000 strokes | 325 | 400 | 295 | 358 | 310 | 348 | 312 |
| Water Solubility (Boiling Water) | (3) | (3) | (3) | (3) | (3) | (3) | (3) |
| Wheel Bearing Test (220° F.) | (4) | | (4) | | (4) | (4) | (4) |
| 450° F. Beaker Test, Lubrication Life Hour (250° F. @ 10,000 r.p.m.) | [2]1,500+ | [2]1,500+ | [2]1,500+ | [2]1,500+ | [2]1,500+ | [2]1,500+ | [2]1,500+ |
| 4-Ball Wear Test Scar Diam. mm. (1,800 r.p.m. @ 75° C., 1 hr.=10 kg. Load) | 0.28 | 0.30 | 0.28 | 0.30 | 0.30 | 0.28 | 0.30 |
| Almen Test (Wgts. Carried Excellent Pin Condition)— | | | | | | | |
| Gradual Loading, 15 wts. Max | | 15 | | 15 | 15 | 15 | 15 |
| Shock Loading, 15 Wts. Max | | 15 | | 15 | 15 | 15 | 15 |

[1] Commercial mixture of fatty acids equivalent to stearic acid.
[2] Tests discontinued after this period.
[3] Insoluble.
[4] Pass.

The above table shows that the greases of this invention have excellent high temperature, high pressure and anti-wear properties. All of the above tests are standard grease tests which are known in the art. The greases described in the above table also show excellent storage stability, showing no oil separation after storage for more than six months.

Greases A through G may be further blended with lubricating oils to form excellent fluid lubricants. For example, 15 weight percent of grease A is blended with 85 weight percent of a light mineral oil having a viscosity at 100° F. of 150 SSU and a viscosity index of 104 to give an excellent lubricating oil containing about 4.5 weight percent of the hydrogenated bisphenolacetic acid metal salt product.

The alkylated carbon bridged phenols are hydrogenated, mixed with acetic acid and the mixture is then neutralized to form the metal salts of this invention according to the same procedure as outlined above.

Any of the following metals may be substituted in the greases of Table I: barium, magnesium, cadmium, chromium, nickel, iron, cobalt, zinc or aluminum. Mixtures of these metals may be employed, if desired.

EXAMPLE II

Excellent grease compositions are also prepared by mixing acetic acid with (a) bis(4-hydroxycyclohexyl) sulfide, and (b) t-amyl cyclohexyl sulfide, followed by neutralization of the mixtures with barium hydroxide in a mineral oil (55 SSU viscosity at 210° F.) menstruum and heating to dehydrating temperatures in the range of 300° to 450° F.

Table II shows the composition in terms of weight percent of the greases and the mol ratio of acetic acid to hydrogenated S-bridged phenols.

Table II

| Composition, Wt. Percent | A | B |
|---|---|---|
| Glacial Acetic Acid | 10.0 | 10.0 |
| Bis (4-hydroxycyclohexyl) sulfide | 5.0 | |
| t-Amyl cyclohexyl sulfide | | 5.0 |
| Barium Hydroxide | 8.0 | 8.0 |
| Phenyl α-Naphthylamine | 1.0 | 1.0 |
| Mineral Oil (55 SSU @ 210° F.) | 76.0 | 76.0 |
| Mol Ratio Acid/Hydrogenated Phenol | 8/1 | 12/1 |

The above greases may also be blended with a lubricating oil to serve as an extreme pressure anti-wear additive.

For example, 10 weight percent of grease A may be blended with a mineral oil having a viscosity at 100° F. of 150 SSU and a viscosity index of 104 to give an excellent lubricating oil containing about 2.3 weight percent of the metal salts as an extreme pressure anti-wear additive.

What is claimed is:

1. A lubricant comprising a major proportion of a lubricating oil having a viscosity in the range of 60 to 3000 SSU at 100° F. and 0.2 to 40 percent by weight of polyvalent metal salts of a hydrogenated bridged phenol and a low molecular weight monocarboxylic acid having about 2 carbon atoms per molecule, wherein said hydrogenated bridged phenol comprises the fully hydrogenated product of a bridged phenol having the following formula:

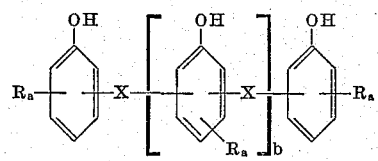

wherein R is a monovalent substituent selected from the group consisting of halogen atoms and hydrocarbyl groups having from 1 to 30 carbon atoms, $a$ is a digit from 0 to 2, $b$ is an integer from 0 to 10, and X is a divalent bridging group selected from the group consisting of divalent alkylidene groups containing 1 to 16 carbon atoms and sulfur, and wherein the molar ratio of said acid to said fully hydrogenated bridged phenol is in the range of 0.02 to 50.

2. A lubricant according to claim 1 wherein said lubricating oil is a mineral oil having a viscosity in the range of 100 to 1200 SSU at 100° F. and wherein the molar ratio of said acid to said fully hydrogenated bridged phenol is in the range of 5 to 40.

3. A lubricant according to claim 1 containing in addition thereto 0.5 to 5.0 weight percent of a polyvalent metal salt of a high molecular weight fatty acid having 10 to 30 carbon atoms per molecule.

4. A lubricant according to claim 1 wherein said polyvalent metal is an alkaline earth metal.

5. A lubricant according to claim 1, wherein said lubricant is a grease containing about 10 to 40 wt. percent of said metal salts.

6. A lubricant according to claim 1, wherein said lubricant is a grease containing 10 to 40 wt. percent of said metal salts, wherein X is sulfur, wherein R is a hydrocarbyl group, and wherein the molar ratio of said acid to said bridged phenol is in the range of about 5:1 to 40:1.

7. The method of preparing the lubricant of claim 6 wherein said fully hydrogenated bridged phenol is dissolved in said acid and the resulting solution is neutralized in situ in said lubricating oil with an excess of an alkaline earth metal hydroxide to give a product wherein the excess alkalinity will be between 0.01 to 0.5%, calculated as sodium hydroxide; followed by dehydrating at temperatures in the range of 300 to 600° F., the mol ratio of said acid to said fully hydrogenated bridged phenol being between about 5 to 40.

8. A method according to claim 7 wherein 0.5 to 5.0 weight percent of a $C_{12}$ to $C_{30}$ fatty acid is added to said lubricating oil prior to addition of said acid and said fully hydrogenated bridged phenol.

9. A method according to claim 7 wherein the dehydration is carried out at a temperature in the range of 300 to 350° F.

10. A lubricant comprising a major proportion of a lubricating oil and a thickening amount of polyvalent metal salt of a fully hydrogenated bridged phenol and metal salt of an acetic acid, wherein said bridged phenol includes two phenolic groups, bridged by sulfur.

References Cited in the file of this patent

UNITED STATES PATENTS

| | | |
|---|---|---|
| 2,197,835 | Reiff | Apr. 23, 1940 |
| 2,225,197 | Stagner | Dec. 17, 1940 |
| 2,369,908 | McCleary | Feb. 20, 1945 |
| 2,376,313 | Reiff | May 15, 1945 |
| 2,805,233 | Bell | Sept. 3, 1957 |
| 2,835,688 | Le Suer | May 20, 1958 |
| 2,921,904 | Hotten | Jan. 19, 1960 |